(12) United States Patent
Palumbo et al.

(10) Patent No.: US 8,087,494 B2
(45) Date of Patent: Jan. 3, 2012

(54) METHOD OF MAKING A COMPOSITE PANEL HAVING SUBSONIC TRANSVERSE WAVE SPEED CHARACTERISTICS

(75) Inventors: Daniel L. Palumbo, Newport News, VA (US); Jacob Klos, Newport News, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/894,326

(22) Filed: Sep. 30, 2010

(65) Prior Publication Data

US 2011/0041310 A1 Feb. 24, 2011

Related U.S. Application Data

(63) Continuation of application No. 11/129,755, filed on May 13, 2005, now abandoned.

(51) Int. Cl.
*E04B 1/82* (2006.01)
*E04B 1/84* (2006.01)
*E04B 1/74* (2006.01)

(52) U.S. Cl. .................... 181/290; 181/288; 181/285

(58) Field of Classification Search .............. 181/290, 181/288, 292, 293, 285, 210; 52/144, 145, 52/783.1
See application file for complete search history.

(56) References Cited

U.S. PATENT DOCUMENTS

| | | | |
|---|---|---|---|
| 2,116,771 A | 5/1938 | Seaman | |
| 2,192,516 A | 3/1940 | Cunnington | |
| 2,198,885 A | 4/1940 | Price | |
| 2,872,710 A | 2/1959 | Cox | |
| 2,973,295 A | 2/1961 | Rodgers | |
| 3,035,657 A | 5/1962 | Lemon | |
| 3,269,484 A | 8/1966 | Lighter | |
| 3,412,513 A | 11/1968 | Gosele | |
| 3,511,335 A | 5/1970 | Uddenburg | |
| 3,656,576 A | 4/1972 | Gubela | |
| 4,077,491 A | 3/1978 | Hankel | |
| 4,111,081 A | 9/1978 | Hilliard | |
| 4,143,495 A | 3/1979 | Hintz | |
| 4,213,516 A | 7/1980 | Sulewsky | |
| 4,228,869 A | 10/1980 | Bschorr | |
| 4,241,806 A | 12/1980 | Metzger | |
| 4,275,801 A | 6/1981 | Bschorr | |
| 4,441,581 A | 4/1984 | Sommerhalder | |
| 4,566,558 A | 1/1986 | Link et al. | |
| 4,705,139 A | 11/1987 | Gahlau et al. | |
| 4,838,524 A * | 6/1989 | McKeown et al. | 256/24 |
| 4,867,271 A * | 9/1989 | Tschudin-Mahrer | 181/290 |
| 5,245,141 A * | 9/1993 | Fortez et al. | 181/288 |
| 5,266,374 A * | 11/1993 | Ogata | 428/77 |

(Continued)

OTHER PUBLICATIONS

G. Kurtze and B.G. Watters, "New Wall Design for High Transmission Loss or High Damping," The Journal of the Acoustical Society of America, vol. 31 ( No. 6), p. 739-748.

*Primary Examiner* — Edgardo San Martin
(74) *Attorney, Agent, or Firm* — Andrea Z. Warmbier

(57) ABSTRACT

A method of making a composite panel having subsonic transverse wave speed characteristics which has first and second sheets sandwiching a core with at least one of the sheets being attached to the core at first regions thereof and unattached to the core at second regions thereof.

21 Claims, 4 Drawing Sheets

U.S. PATENT DOCUMENTS

| | | | |
|---|---|---|---|
| 5,473,125 A * | 12/1995 | Stief et al. | 181/290 |
| 5,567,922 A | 10/1996 | Schmeck et al. | |
| 5,690,035 A * | 11/1997 | Hatayama et al. | 105/452 |
| 5,712,447 A | 1/1998 | Hanson | |
| 5,744,763 A * | 4/1998 | Iwasa et al. | 181/286 |
| 5,892,187 A * | 4/1999 | Patrick | 181/286 |
| 5,894,044 A * | 4/1999 | Norcom et al. | 428/116 |
| 6,007,890 A * | 12/1999 | DeBlander | 428/72 |
| 6,174,587 B1 * | 1/2001 | Figge, Sr. | 428/178 |
| 6,260,660 B1 | 7/2001 | Yoerkie et al. | |
| 6,681,890 B1 | 1/2004 | Chen et al. | |
| 6,878,432 B2 | 4/2005 | Ueda et al. | |
| 6,951,264 B2 * | 10/2005 | Byma et al. | 181/286 |
| 6,983,821 B2 * | 1/2006 | Putt et al. | 181/290 |
| 7,011,181 B2 * | 3/2006 | Albin, Jr. | 181/290 |
| 2003/0178250 A1 | 9/2003 | Putt et al. | |
| 2004/0129493 A1 * | 7/2004 | Campbell | 181/204 |
| 2005/0263346 A1 * | 12/2005 | Nishimura | 181/290 |
| 2006/0065482 A1 * | 3/2006 | Schmidft et al. | 181/290 |
| 2006/0272279 A1 * | 12/2006 | Palumbo et al. | 52/783.1 |
| 2008/0128202 A1 * | 6/2008 | Palumbo et al. | 181/292 |

* cited by examiner

METHOD OF MAKING A COMPOSITE PANEL HAVING SUBSONIC TRANSVERSE WAVE SPEED CHARACTERISTICS

CROSS-REFERENCE TO RELATED PATENT APPLICATIONS

This patent application is a continuation of U.S. patent application Ser. No. 11/129,755, filed May 13, 2005 now abandoned, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to composite panels. More specifically, the invention is a composite panel that has subsonic transverse wave speed characteristics in regions thereof for reduced sound radiation efficiency and increased sound power transmission loss.

2. Description of the Related Art

Composite materials are used in many construction applications (e.g., structures, aircraft, trains, vehicles, industrial machines, etc.) because of their light weight and strength. The materials are frequently formed into what are known as composite panels where two sheets of one type of material are sandwiched about another type of core material. For example, one type of composite panel has two sheets of a material such as graphite-epoxy, epoxy, fiberglass or aluminum sandwiched about a honeycomb core made from materials such as NOMEX, aluminum or paper. The resulting composite panel is light and stiffer than any of its component parts. However, as can be the case with most lightweight and stiff materials, sound can be radiated very efficiently because the transverse wave speed through the panel can be greater than the speed of sound in air. In other words, the composite panel has a supersonic transverse wave speed. If the composite panel is to be used to define a human-occupied interior space, noise radiated by the composite panel into the interior space may be unacceptable. Current methods of addressing this noise problem have involved the addition of noise control material to the composite panel such that the noise-controlled composite panel is characterized by a subsonic transverse wave speed. Suggested additions include a limp mass (e.g., lead vinyl) applied to one or both of the composite panel's face sheets and/or the inclusion of foam within the composite panel's core in the case of a honeycomb core. However, the extra noise-control material adds cost and weight to the composite panel.

SUMMARY OF THE INVENTION

Accordingly, it is an object of the present invention to provide a composite panel having subsonic transverse wave speed characteristics.

Another object of the present invention is to provide a composite panel that does not require the addition of noise control material to achieve subsonic transverse wave speed characteristics.

In accordance with the present invention, a composite panel has first and second sheets sandwiching a core. At least one of the first and second sheets is attached to the core at first regions thereof and unattached to the core at second regions thereof.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
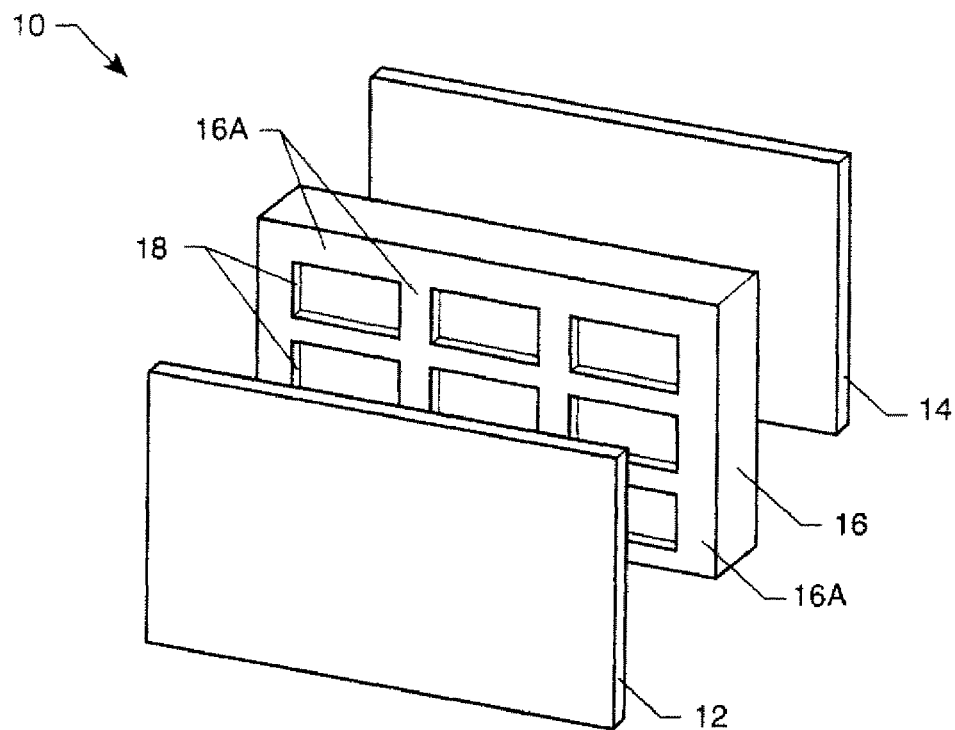
FIG. 1 is an exploded perspective view of a composite panel having a core with recessed regions in accordance with an embodiment of the present invention.
Figure 2:
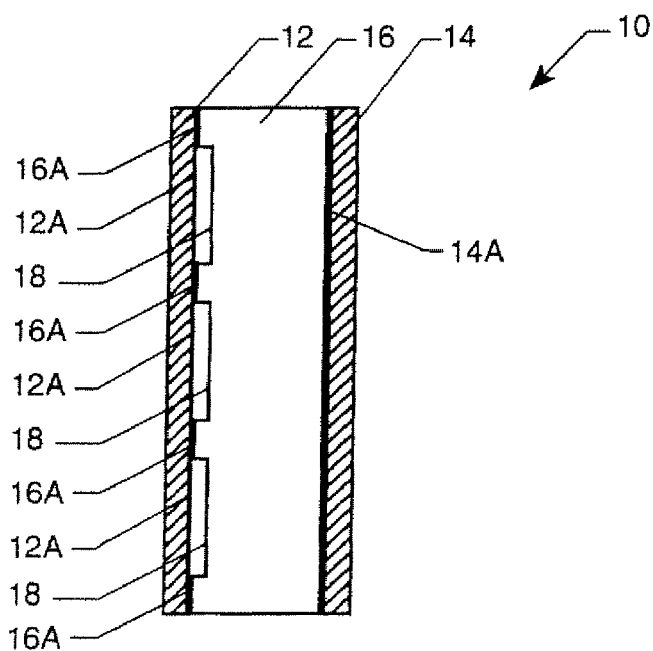
FIG. 2 is a cross-sectional view of the composite panel of FIG. 1 in its assembled form.

Referring now to the drawings, and more particularly to FIGS. 1 and 2, a composite panel in accordance with an embodiment of the present invention is shown and is referenced generally by numeral 10. For illustration, composite panel 10 is a flat panel. However it is to be understood that composite panels constructed in accordance with the present invention can also be shaped to define contoured panels as needed.

Composite panel 10 has face sheets 12 and 14 sandwiched about a core 16. Face sheets 12 and 14 can be the same or different materials. Suitable materials for face sheets 12 and 14 include, but are not limited to, graphite epoxy, aluminum and fiberglass. Core 16 is a lightweight material that is bonded, attached or adhered (in ways well understood in the art) to face sheets 12 and 14 to foam composite panel 10 such that the stiffness of composite panel 10 is greater than the stiffness of its component parts. As a result, while the transverse wave speed for typical materials and thicknesses of face sheets 12 and 14 is subsonic, the transverse wave speed is very often supersonic for a composite panel using these face sheets. Suitable constructions for core 16 include, but are not limited to, a honeycomb structure, a truss structure, or a foam structure. Suitable materials for core 16 include, but are not limited to, NOMEX, paper and aluminum in the case of honeycomb cores, and polymers and carbon in the case of foam cores. The core can be of varying thicknesses depending, for example, on a particular application, without departing from the scope of the present invention.

One embodiment of the present invention addresses this problem by forming recesses in core 16 adjacent face sheet 12. More specifically, an array of recesses 18 are formed in core 16 so that face sheet 12 is only bonded/attached/adhered to core at regions 16A while the entire side of face sheet 14 is bonded/attached/adhered to the other side of core 16 as indicated by 14A. The number, size, depth and shape of recesses 18 and resulting size/shape of regions 16A can vary without departing from the scope of the present invention. In general, a balance must be struck between stiffness requirements and noise requirements of composite panel 10. With respect to noise reduction, the greater the area of the recesses, the greater the reduction in sound radiation efficiency and increase in sound power transmission loss. This is because each region 12A of face sheet 12 adjacent to a recess 18 is uncoupled from core 16 so that transverse wave speed at this local region of composite panel 10 is reduced to the subsonic transverse wave speed of face sheet 12. With respect to stiffness, composite panel 10 must have sufficient attachment regions 16A (between face sheet 12 and core 16) to achieve the necessary stiffness requirements. Accordingly, any given application of the present invention will require these two criteria to be balanced.

Figure 3:
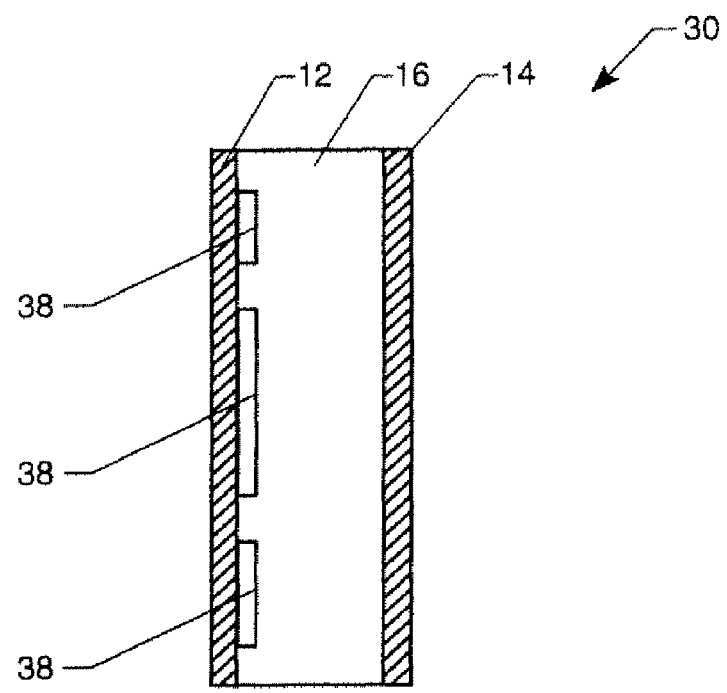
FIG. 3 is a cross-sectional view of a composite panel in accordance with another embodiment of the present invention where the recesses are different sizes.
Figure 4:
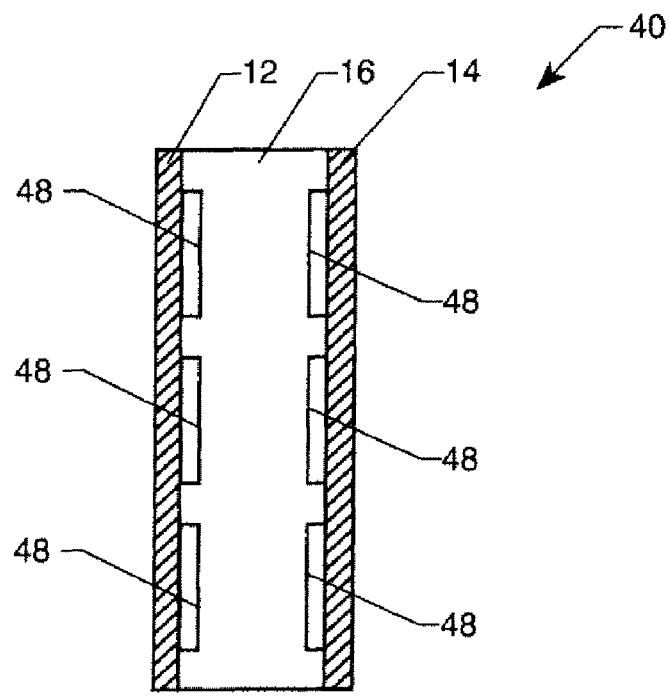
FIG. 4 is a cross-sectional view of a composite panel in accordance with another embodiment of the present invention where the recesses are formed on either side of the core in a mirror-image fashion.
Figure 5:
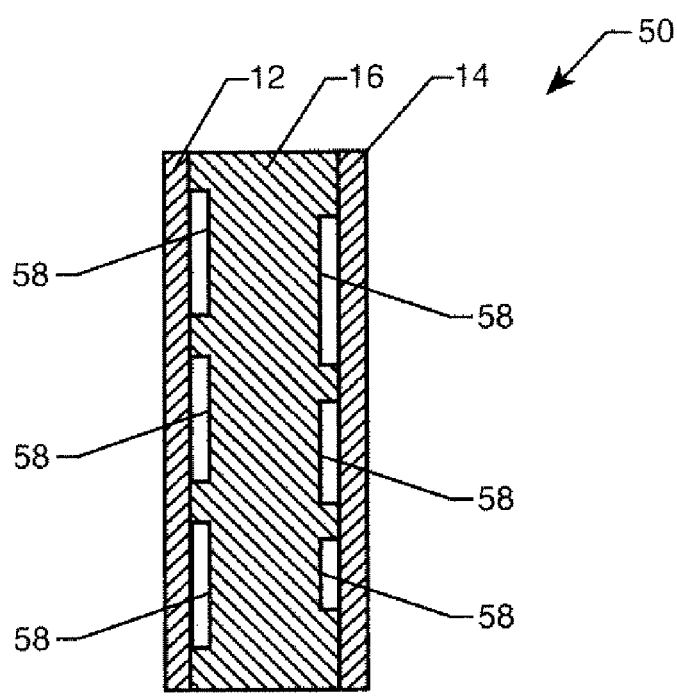
FIG. 5 is a cross-sectional view of a composite panel in accordance with another embodiment of the present invention where the recesses are formed on either side of the core in a non-mirror-image fashion.

In the illustrated embodiment discussed thus far, identically-sized recesses 18 are formed just on one side of core 16. However, the present invention is not so limited. For example, composite panel 30 in FIG. 3 has recesses 38 formed in core 16 that are of different sizes. Note that the shapes of recesses 38 could vary too. In FIG. 4, composite panel 40 has recesses 48 formed on either side of core 16 in a mirror-image fashion so that the regions of face sheets 12 and 14 contacting and attached to core 16 are similarly mirror images of one another. Composite panel 50 in FIG. 5 utilizes recesses 58 on opposing sides of core 16, but in a non-mirror-image fashion.

Figure 6:
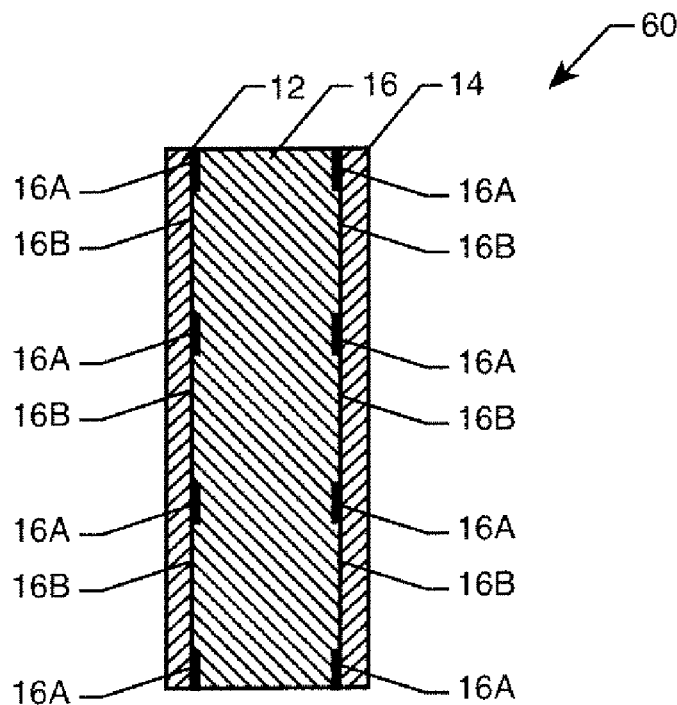
FIG. 6 is a cross-sectional view of a composite panel in accordance with another embodiment of the present invention where areas of non-attachment are provided between the core and face sheets.

Another embodiment of the present invention is illustrated by a composite panel 60 in FIG. 6 where, rather than forming recesses in core 16, regions of non-attachment 16B are formed between face sheets 12/14 and core 16. That is, face sheets 12 and 14 are coupled to core 16 only at attachment regions 16A while remaining uncoupled or unattached to core 16 at non-attached regions 16B. As sound radiates through composite panel 60, friction losses will be generated between the non-attached regions 16B of core 16 and face sheets 12 and 14. In many applications, this will be sufficient to produce a satisfactory low frequency response. However, higher-frequency buzzing may occur thereby making this embodiment most suitable for applications where high-frequency buzzing is not problematic.

Figure 7:
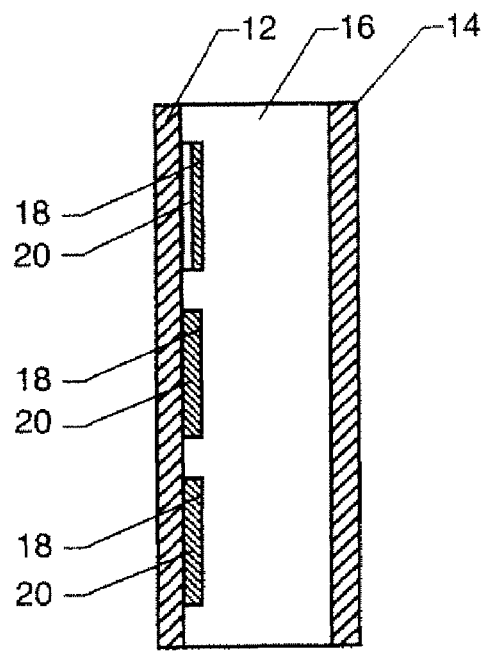
FIG. 7 is a cross-sectional view of the composite panel of FIG. 2 further having acoustically absorbent material in the panel's recesses.

Still another embodiment of the present invention involves adding an acoustically absorbent material (a wide variety of which are well known in the art) to some or all of the recesses formed in the composite panel's core. For example, FIG. 7 illustrates the FIG. 2 embodiment with recesses 18 further having an acoustically absorbent material 20 partially or completely filling recesses 18.

Figure 8:
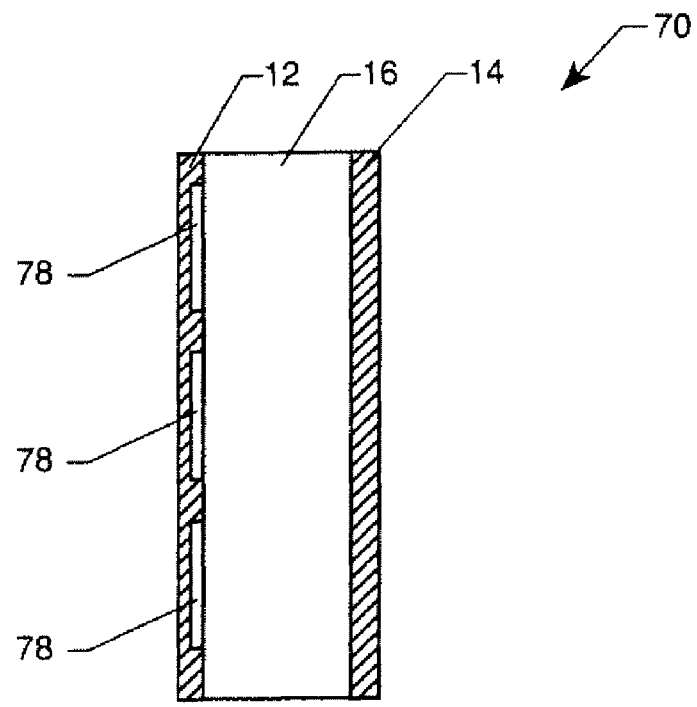
FIG. 8 is a cross-sectional view of a composite panel in accordance with another embodiment of the present invention where recesses are formed in one of the face sheets.

The present invention is not limited to the formation of recesses in the core of a composite panel. For example, a composite panel 70 illustrated in FIG. 8 has recesses 78 formed in face sheet 12. Although not illustrated, recesses could also be formed in face sheet 14 in a mirror-image or non-mirror-image fashion with respect to recesses 78. Still further, recesses could be formed in one or both of face sheets 12/14 and in core 16 without departing from the scope of the present invention.

The advantages of the present invention are numerous. Composite panels having local regions characterized by subsonic transverse wave speeds can be constructed without requiring the addition of noise control material. Rather, the present invention addresses the transverse wave speed problem of composite panels by actually eliminating material thereby decreasing the weight of the panel. Cores and/or face sheets with recesses formed therein can be easily achieved using automated manufacturing processes. The present invention can be used wherever composite materials are used in weight sensitive, noise environments such as aerospace and ground vehicles, trains and industrial machines.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed as new and desired to be secured by Letters Patent of the United States is:

1. A method of making a structurally stiff composite panel characterized by having a subsonic transverse wave speed for reduced vibrational sound radiation, comprising the steps of:
   providing a lightweight core, a first sheet, and a second sheet;
   sandwiching said lightweight core between said first sheet and said second sheet;
   attaching at least one of said first sheet and said second sheet to said lightweight core at first regions thereof wherein second regions of said lightweight core remain unattached to said at least one of said first and second sheet to thereby form a composite panel such that subsonic transverse wave speed characteristics are exhibited by the composite panel at said second regions; and
   said step of attaching including the step of adjusting a total area of said first regions that defines a structural stiffness of the composite panel and a total area of said second regions that defines sound radiation efficiency and sound power transmission loss of the composite panel, wherein a desired balance is formed between the composite panel's structural stiffness and the composite panel's sound radiation efficiency and sound pressure transmission loss.

2. The method according to claim 1, further comprising the step of forming an empty recess in at least one of said lightweight core, said first sheet and said second sheet at each of said second regions, wherein the composite panel constructed without said empty recess would have a supersonic transverse wave speed.

3. The method according to claim 1, wherein said first sheet and said second sheet are the same material.

4. The method according to claim 1, wherein said first sheet and said second sheet are different materials.

5. The method according to claim 2, wherein said lightweight core is selected from the group consisting of a honeycomb core, a truss core, and a foam core.

6. The method according to claim 1, wherein transverse wave speed of said first sheet and said second sheet is subsonic.

7. The method according to claim 1, wherein said second regions adjacent to said first sheet are mirror imaged with respect to said second regions adjacent to said second sheet.

8. The method according to claim 1, wherein said second regions are identically sized and shaped.

9. The method according to claim 1, further comprising the step of completely attaching a face of one of said first sheet and said second sheet to said lightweight core.

10. The method according to claim 1, wherein at least one of said lightweight core, said first sheet and said second sheet is recess free.

11. The method according to claim 1, wherein each of said lightweight core, said first sheet and said second sheet are recess free.

12. The method according to claim 1, wherein said first sheet and said second sheet are a material selected from the group consisting of graphite epoxy, aluminum, and fiberglass.

13. A method of making a structurally stiff composite panel characterized by having a subsonic transverse wave speed for reduced vibrational sound radiation, comprising the steps of:
   providing a core, a first sheet, and a second sheet, wherein transverse wave speed of said first sheet and said second sheet is subsonic;
   sandwiching said core between said first sheet and said second sheet;
   selectively attaching said first sheet to said core at first regions thereof wherein second regions of said core remain unattached to said first sheet to thereby form a composite panel such that subsonic transverse wave speed characteristics are exhibited by the composite panel at said second regions;
   completely attaching a face of said second sheet to said core; and
   said step of selectively attaching including the step of adjusting a total area of said first regions that defines a structural stiffness of the composite panel and a total area of said second regions that defines sound radiation efficiency and sound power transmission loss of the composite panel wherein a desired balance is formed between the composite panel's structural stiffness and the composite panel's sound radiation efficiency and sound pressure transmission loss.

14. The method according to claim 13, further comprising the step of forming an empty recess in at least one of said core and said first sheet at each of said second regions.

15. The method according to claim 13, wherein said first sheet and said second sheet are the same material.

16. The method according to claim 13, wherein said first sheet and said second sheet are different materials.

17. The method according to claim 13, wherein said core is selected from the group consisting of a honeycomb core, a truss core, and a foam core.

18. The method according to claim 13, wherein said second regions are identically sized and shaped.

19. The method according to claim 13, wherein at least one of said core and said first sheet is recess free.

20. The method according to claim 13, wherein said first sheet and said second sheet are a material selected from the group consisting of graphite epoxy, aluminum, and fiberglass.

21. A method of making a structurally stiff composite panel having subsonic transverse wave speed characteristics for reduced vibrational sound radiation, comprising the steps of:
   providing a core, a first sheet, and a second sheet, wherein transverse wave speed of said first sheet and said second sheet is subsonic, wherein said core and said first sheet are recess free;
   sandwiching said core between said first sheet and said second sheet;
   selectively attaching said first sheet to said core at first regions thereof wherein second regions of said core remain unattached to said first sheet to thereby form a composite panel such that subsonic transverse wave speed characteristics are exhibited by the composite panel at said second regions;
   completely attaching a face of said second sheet to said core; and
   said step of selectively attaching including the step of adjusting a total area of said first regions that defines a structural stiffness of the composite panel and a total area of said second regions that defines sound radiation efficiency and sound power transmission loss of the composite panel wherein a desired balance is formed between the composite panel's structural stiffness and the composite panel's sound radiation efficiency and sound pressure transmission loss.

\* \* \* \* \*